(12) United States Patent
Salvetti et al.

(10) Patent No.: US 9,392,379 B2
(45) Date of Patent: *Jul. 12, 2016

(54) OUTPUT PHASE MODULATION ENTRAINMENT CONTAINMENT FOR DIGITAL FILTERS

(71) Applicant: Starkey Laboratories, Inc., Eden Prairie, MN (US)

(72) Inventors: Arthur Salvetti, Colorado Springs, CO (US); Harikrishna P. Natarajan, Shakopee, MN (US); Jon S. Kindred, Minneapolis, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/589,275

(22) Filed: Jan. 5, 2015

(65) Prior Publication Data

US 2015/0110317 A1    Apr. 23, 2015

Related U.S. Application Data

(60) Continuation of application No. 14/105,269, filed on Dec. 13, 2013, now Pat. No. 8,929,565, which is a continuation of application No. 12/980,720, filed on Dec. 29, 2010, now Pat. No. 8,634,576, which is a division of application No. 11/276,763, filed on Mar. 13, 2006, now Pat. No. 8,116,473.

(51) Int. Cl.
*H04R 3/00* (2006.01)
*H04B 15/00* (2006.01)
(Continued)

(52) U.S. Cl.
CPC ............. *H04R 25/45* (2013.01); *H04M 9/082* (2013.01); *H04R 3/002* (2013.01); *H04R 25/453* (2013.01); *H04R 3/02* (2013.01)

(58) Field of Classification Search
CPC .......... H04R 3/002; H04R 1/22; H04R 25/45; H04R 25/453; H04R 3/02; H04M 9/082
USPC ............... 381/96, 318, 94.5, 95, 83, 93, 317, 381/71.11, 71.12, 108, 58–60, 97
See application file for complete search history.

(56) References Cited

U.S. PATENT DOCUMENTS 3,601,549 A   8/1971   Mitchell
4,176,252 A   11/1979  Dutkovich
(Continued)

FOREIGN PATENT DOCUMENTS

DE   19748079 A1   5/1999
DK   1835708 T3    8/2013
(Continued)

OTHER PUBLICATIONS

"Advance Adaptive Feedback Cancellation", IntriCon: Technology White Paper, [Online]. Retrieved from the Internet: <URL: http://www.intricondownloads.com/D1/techdemo/WP_Advanced_AFC_rev101006.pdf>, (Oct. 10, 2005), 3 pgs.
(Continued)

*Primary Examiner* — Vivian Chin
*Assistant Examiner* — Douglas Suthers
(74) *Attorney, Agent, or Firm* — Schwegman Lundberg & Woessner, P.A.

(57) ABSTRACT

Method and apparatus for entrainment containment in digital filters using output phase modulation. Phase change is gradually introduced into the acoustic feedback canceller loop to avoid entrainment of the feedback canceller filter. Various embodiments employing different output phase modulation approaches are set forth and time and frequency domain examples are provided. Additional method and apparatus can be found in the specification and as provided by the attached claims and their equivalents.

20 Claims, 10 Drawing Sheets

(51) Int. Cl.
*H04R 1/40* (2006.01)
*H04R 25/00* (2006.01)
*H04M 9/08* (2006.01)
*H04R 3/02* (2006.01)

(56) References Cited

U.S. PATENT DOCUMENTS

| | | | |
|---|---|---|---|
| 4,495,643 | A | 1/1985 | Orban |
| 4,731,850 | A | 3/1988 | Levitt et al. |
| 4,783,817 | A | 11/1988 | Hamada et al. |
| 4,879,749 | A | 11/1989 | Levitt et al. |
| 4,985,925 | A | 1/1991 | Langberg et al. |
| 5,016,280 | A | 5/1991 | Engebretson et al. |
| 5,027,410 | A | 6/1991 | Williamson et al. |
| 5,091,952 | A | 2/1992 | Williamson et al. |
| 5,259,033 | A | 11/1993 | Goodings et al. |
| 5,276,739 | A | 1/1994 | Krokstad et al. |
| 5,402,496 | A | 3/1995 | Soli et al. |
| 5,502,869 | A | 4/1996 | Smith et al. |
| 5,533,120 | A | 7/1996 | Staudacher |
| 5,619,580 | A | 4/1997 | Hansen |
| 5,621,802 | A | 4/1997 | Harjani et al. |
| 5,659,622 | A | 8/1997 | Ashley |
| 5,668,747 | A | 9/1997 | Ohashi |
| 6,072,884 | A | 6/2000 | Kates |
| 6,104,993 | A | 8/2000 | Ashley |
| 6,173,063 | B1 | 1/2001 | Melanson |
| 6,219,427 | B1 | 4/2001 | Kates et al. |
| 6,356,606 | B1 | 3/2002 | Hahm |
| 6,389,440 | B1 | 5/2002 | Lewis et al. |
| 6,434,246 | B1 | 8/2002 | Kates et al. |
| 6,434,247 | B1 | 8/2002 | Kates et al. |
| 6,480,610 | B1 | 11/2002 | Fang et al. |
| 6,498,858 | B2 | 12/2002 | Kates |
| 6,552,446 | B1 | 4/2003 | Lomba et al. |
| 6,563,931 | B1 | 5/2003 | Soli et al. |
| 6,754,356 | B1 | 6/2004 | Luo et al. |
| 6,831,986 | B2 | 12/2004 | Kates |
| 6,882,736 | B2 | 4/2005 | Dickel et al. |
| 7,058,182 | B2 | 6/2006 | Kates |
| 7,065,486 | B1 | 6/2006 | Thyssen |
| 7,068,802 | B2 | 6/2006 | Schulz et al. |
| 7,088,835 | B1 | 8/2006 | Norris et al. |
| 7,155,018 | B1 | 12/2006 | Stokes, III et al. |
| 7,519,193 | B2 | 4/2009 | Fretz |
| 7,809,150 | B2 | 10/2010 | Natarajan et al. |
| 7,995,780 | B2 | 8/2011 | Pedersen et al. |
| 8,116,473 | B2 | 2/2012 | Salvetti et al. |
| 8,199,948 | B2 | 6/2012 | Theverapperuma |
| 8,452,034 | B2 | 5/2013 | Theverapperuma |
| 8,553,899 | B2 | 10/2013 | Salvetti et al. |
| 8,634,576 | B2 | 1/2014 | Salvetti et al. |
| 8,681,999 | B2 | 3/2014 | Theverapperuma et al. |
| 8,917,891 | B2 | 12/2014 | Natarajan |
| 8,929,565 | B2 | 1/2015 | Salvetti et al. |
| 8,942,398 | B2 | 1/2015 | Salvetti et al. |
| 9,191,752 | B2 | 11/2015 | Theverapperuma et al. |
| 2001/0002930 | A1 | 6/2001 | Kates |
| 2003/0026442 | A1 | 2/2003 | Fang et al. |
| 2003/0031314 | A1 | 2/2003 | Tanrikulu et al. |
| 2003/0185411 | A1 | 10/2003 | Atlas et al. |
| 2004/0086137 | A1 | 5/2004 | Yu et al. |
| 2004/0125973 | A1 | 7/2004 | Fang et al. |
| 2004/0136557 | A1 | 7/2004 | Kaulberg |
| 2005/0036632 | A1 | 2/2005 | Natarajan et al. |
| 2005/0047620 | A1 | 3/2005 | Fretz |
| 2006/0140429 | A1 | 6/2006 | Klinkby et al. |
| 2007/0223755 | A1 | 9/2007 | Salvetti et al. |
| 2008/0063228 | A1 | 3/2008 | Mejia et al. |
| 2008/0095389 | A1 | 4/2008 | Theverapperuma |
| 2008/0130926 | A1 | 6/2008 | Theverapperuma |
| 2008/0130927 | A1 | 6/2008 | Theverapperuma et al. |
| 2009/0175474 | A1 | 7/2009 | Salvetti et al. |
| 2010/0111339 | A1 | 5/2010 | Sira |
| 2011/0091049 | A1 | 4/2011 | Salvetti et al. |
| 2011/0116667 | A1 | 5/2011 | Natarajan et al. |
| 2011/0249846 | A1 | 10/2011 | Natarajan |
| 2011/0249847 | A1 | 10/2011 | Salvetti et al. |
| 2012/0230503 | A1 | 9/2012 | Theverapperuma |
| 2014/0098967 | A1 | 4/2014 | Salvetti et al. |
| 2014/0348361 | A1 | 11/2014 | Theverapperuma et al. |

FOREIGN PATENT DOCUMENTS

| | | |
|---|---|---|
| EP | 1718110 A1 | 2/2006 |
| EP | 2080408 B1 | 8/2012 |
| EP | 1835708 B1 | 5/2013 |
| WO | WO-0106746 A2 | 1/2001 |
| WO | WO-0106812 A1 | 1/2001 |
| WO | WO-2004105430 A1 | 12/2004 |
| WO | WO-2008051569 A2 | 5/2008 |
| WO | WO-2008051569 A3 | 5/2008 |
| WO | WO-2008051570 A1 | 5/2008 |

OTHER PUBLICATIONS

"U.S. Appl. No. 10/857,599, Final Office Action mailed Jun. 11, 2009", 7 pgs.

"U.S. Appl. No. 10/857,599, Final Office Action Mailed Jul. 24, 2008", 9 pgs.

"U.S. Appl. No. 10/857,599, Non-Final Office Action mailed Jan. 26, 2010", 8 pgs.

"U.S. Appl. No. 10/857,599, Non-Final Office Action mailed Dec. 26, 2007", 8 pgs.

"U.S. Appl. No. 10/857,599, Non-Final Office Action mailed Dec. 31, 2008", 6 pgs.

"U.S. Appl. No. 10/857,599, Notice of Allowance mailed Jul. 26, 2010", 10 pgs.

"U.S. Appl. No. 10/857,599, Response filed Apr. 26, 2010 to Non Final Office Action mailed Jan. 26, 2010", 8 pgs.

"U.S. Appl. No. 10/857,599, Response filed Apr. 28, 2008 to Non-Final Office Action mailed Dec. 26, 2007", 7 pgs.

"U.S. Appl. No. 10/857,599, Response filed Apr. 30, 2009 to Non-Final Office Action mailed Dec. 31, 2008", 7 pgs.

"U.S. Appl. No. 10/857,599, Response filed Nov. 12, 2009 to Final Office Action mailed Jun. 11, 2009", 9 pgs.

"U.S. Appl. No. 10/857,599, Response filed Nov. 16, 2007 to Restriction Requirement mailed May 21, 2007", 6 pgs.

"U.S. Appl. No. 10/857,599, Response filed Nov. 24, 2008 to Final Office Action mailed Jul. 24, 2008", 9 pgs.

"U.S. Appl. No. 10/857,599, Restriction Requirement mailed May 21, 2007", 5 pgs.

"U.S. Appl. No. 11/276,763, Decision on Pre-Appeal Brief Request mailed Feb. 15, 2011", 3 pgs.

"U.S. Appl. No. 11/276,763, Final Office Action mailed Sep. 14, 2010", 9 pgs.

"U.S. Appl. No. 11/276,763, Non-Final Office Action mailed Apr. 2, 2010", 11 pgs.

"U.S. Appl. No. 11/276,763, Notice of Allowance mailed Aug. 25, 2011", 8 pgs.

"U.S. Appl. No. 11/276,763, Notice of Allowance mailed Oct. 11, 2011", 8 pgs.

"U.S. Appl. No. 11/276,763, Pre-Appeal Brief Request filed Jan. 14, 2011", 5 pgs.

"U.S. Appl. No. 11/276,763, Response filed Jan. 11, 2010 to Restriction Requirement mailed Dec. 10, 2009", 9 pgs.

"U.S. Appl. No. 11/276,763, Response filed Jun. 15, 2011 to Final Office Action mailed Sep. 14, 2010 and Decision on Pre-Appeal Brief mailed Feb. 15, 2011", 10 pgs.

"U.S. Appl. No. 11/276,763, Response filed Jul. 2, 2010 to Non Final Office Action mailed Apr. 2, 2010", 15 pgs.

"U.S. Appl. No. 11/276,763, Restriction Requirement mailed Dec. 10, 2009", 6 pgs.

"U.S. Appl. No. 11/877,317, Non Final Office Action mailed Aug. 18, 2011", 16 pgs.

"U.S. Appl. No. 11/877,317, Notice of Allowance mailed Jan. 31, 2013", 8 pgs.

"U.S. Appl. No. 11/877,317, Notice of Allowance mailed Jun. 1, 2012", 12 pgs.

(56) References Cited

OTHER PUBLICATIONS

"U.S. Appl. No. 11/877,317, Notice of Allowance mailed Sep. 17, 2012", 8 pgs.
"U.S. Appl. No. 11/877,317, Response filed Feb. 20, 2012 to Non Final Office Action mailed Aug. 18, 2011", 9 pgs.
"U.S. Appl. No. 11/877,567, Non Final Office Action mailed Sep. 1, 2011", 17 pgs.
"U.S. Appl. No. 11/877,567, Notice of Allowance mailed Apr. 12, 2013", 9 pgs.
"U.S. Appl. No. 11/877,567, Notice of Allowance mailed May 31, 2012", 11 pgs.
"U.S. Appl. No. 11/877,567, Notice of Allowance mailed Sep. 28, 2012", 8 pgs.
"U.S. Appl. No. 11/877,567, Notice of Allowance mailed Nov. 14, 2013", 10 pgs.
"U.S. Appl. No. 11/877,567, Response filed Mar. 1, 2012 to Non Final Office Action mailed Sep. 1, 2011", 11 pgs.
"U.S. Appl. No. 11/877,606, Examiner Interview Summary mailed Feb. 8, 2012", 1 pg.
"U.S. Appl. No. 11/877,606, Final Office Action mailed Dec. 2, 2011", 11 pgs.
"U.S. Appl. No. 11/877,606, Non Final Office Action mailed Jun. 10, 2011", 12 pgs.
"U.S. Appl. No. 11/877,606, Notice of Allowance mailed Feb. 15, 2012", 10 pgs.
"U.S. Appl. No. 11/877,606, Response filed Feb. 2, 2012 to Final Office Action mailed Dec. 2, 2011", 9 pgs.
"U.S. Appl. No. 11/877,606, Response filed Sep. 12, 2011 to Non-Final Office Action mailed Jun. 10, 2011", 7 pgs.
"U.S. Appl. No. 12/336,460, Advisory Action mailed Jul. 30, 2012", 3 pgs.
"U.S. Appl. No. 12/336,460, Final Office Action mailed Apr. 27, 2012", 8 pgs.
"U.S. Appl. No. 12/336,460, Non Final Office Action mailed Sep. 29, 2011", 13 pgs.
"U.S. Appl. No. 12/336,460, Non Final Office Action mailed Nov. 26, 2012", 6 pgs.
"U.S. Appl. No. 12/336,460, Notice of Allowance mailed May 10, 2013", 9 pgs.
"U.S. Appl. No. 12/336,460, Response filed Jan. 30, 2012 to Non Final Office Action mailed Sep. 29, 2011", 25 pgs.
"U.S. Appl. No. 12/336,460, Response filed Apr. 26, 2013 to Non final Office Action mailed Nov. 26, 2012", 8 pgs.
"U.S. Appl. No. 12/336,460, Response filed Jun. 27, 2012 to Final Office Action mailed Apr. 27, 2012", 10 pgs.
"U.S. Appl. No. 12/336,460, Supplemental Notice of Allowability mailed Sep. 13, 2013", 2 pgs.
"U.S. Appl. No. 12/875,646, Advisory Action mailed May 19, 2014", 3 pgs.
"U.S. Appl. No. 12/875,646, Final Office Action mailed Feb. 25, 2014", 10 pgs.
"U.S. Appl. No. 12/875,646, Final Office Action mailed Oct. 25, 2012", 10 pgs.
"U.S. Appl. No. 12/875,646, Non Final Office Action mailed Jan. 30, 2012", 4 pgs.
"U.S. Appl. No. 12/875,646, Non Final Office Action mailed May 10, 2013", 9 pgs.
"U.S. Appl. No. 12/875,646, Non Final Office Action mailed Jun. 25, 2014", 10 pgs.
"U.S. Appl. No. 12/875,646, Response filed Apr. 25, 2013 to Final Office Action mailed Oct. 25, 2012", 9 pgs.
"U.S. Appl. No. 12/875,646, Response filed Apr. 25, 2014 to Final Office Action mailed Feb. 25, 2014", 9 pgs.
"U.S. Appl. No. 12/875,646, Response filed Jul. 30, 2012 to Non Final Office Action mailed Jan. 30, 2012", 7 pgs.
"U.S. Appl. No. 12/875,646, Response filed Oct. 10, 2013 to Non Final Office Action mailed May 10, 2013", 11 pgs.
"U.S. Appl. No. 12/980,720, Non Final Office Action mailed Dec. 14, 2012", 10 pgs.
"U.S. Appl. No. 12/980,720, Notice of Allowance mailed May 29, 2013", 8 pgs.
"U.S. Appl. No. 12/980,720, Notice of Allowance mailed Sep. 11, 2013", 8 pgs.
"U.S. Appl. No. 12/980,720. Response filed May 14, 2013 to Non Final Office Action mailed Dec. 14, 2013", 8 pgs.
"U.S. Appl. No. 13/085,033, Advisory Action mailed Nov. 7, 2013", 3 pgs.
"U.S. Appl. No. 13/085,033, Final Office Action mailed Aug. 26, 2013", 12 pgs.
"U.S. Appl. No. 13/085,033, Non Final Office Action mailed Mar. 6, 2014", 12 pgs.
"U.S. Appl. No. 13/085,033, Non Final Office Action mailed May 2, 2013", 10 pgs.
"U.S. Appl. No. 13/085,033, Non Final Office Action mailed Nov. 9, 2012", 9 pgs.
"U.S. Appl. No. 13/085,033, Response filed Apr. 9, 2013 to Non Final Office Action mailed Nov. 9, 2012", 8 pgs.
"U.S. Appl. No. 13/085,033, Response filed Jun. 17, 2014 to Non Final Office Action mailed Mar. 6, 2014", 9 pgs.
"U.S. Appl. No. 13/085,033, Response filed Aug. 2, 2013 to Non Final Office Action mailed May 2, 2013", 8 pgs.
"U.S. Appl. No. 13/085,033, Response filed Oct. 28, 2013 to Final Office Action mailed Aug. 26, 2013", 10 pgs.
"U.S. Appl. No. 13/085,042, Final Office Action mailed May 6, 2013", 10 pgs.
"U.S. Appl. No. 13/085,042, Non Final Office Action mailed Nov. 9, 2012", 9 pgs.
"U.S. Appl. No. 13/085,042, Notice of Allowance mailed Mar. 17, 2014", 5 pgs.
"U.S. Appl. No. 13/085,042, Notice of Allowance mailed Jul. 25, 2013", 6 pgs.
"U.S. Appl. No. 13/085,042, Response filed Apr. 9, 2013 to Non Final Office Action mailed Nov. 9, 2012", 8 pgs.
"U.S. Appl. No. 13/085,042, Response filed Jul. 8, 2013 to Final Office Action mailed May 6, 2013", 8 pgs.
"U.S. Appl. No. 13/478,570, Non Final Office Action mailed Aug. 13, 2013", 7 pgs.
"U.S. Appl. No. 13/478,570, Notice of Allowance mailed Jan. 21, 2014", 5 pgs.
"U.S. Appl. No. 13/478,570, Response filed Nov. 13, 2013 to Non Final Office Action mailed Aug. 13, 2013", 10 pgs.
"U.S. Appl. No. 14/105,269, Non Final Office Action mailed Mar. 13, 2014", 10 pgs.
"U.S. Appl. No. 14/105,269, Notice of Allowance mailed Aug. 21, 2014", 7 pgs.
"U.S. Appl. No. 14/105,269, Response Filed Jul. 14, 2014 to Non Final Office Action mailed Mar. 13, 2014", 7 pgs.
"U.S. Appl. No. 14/105,269, Supplemental Notice of Allowability mailed Sep. 15, 2014", 3 pgs.
"Entrainment (Physics)", [Online]. Retrieved from the Internet: <URL: http://en.wikipedia.org/w/index.php?title=Entrainment_(physics)&printable=yes>, (Accessed Jun. 18, 2009), 2 pgs.
"European Application Serial No. 07839766.8, Office Action mailed Jun. 8, 2009", 2 pgs.
"European Application Serial No. 07839766.8, Office Action mailed Sep. 17, 2012", 10 pgs.
"European Application Serial No. 07250899.7, Extended European Search Report mailed May 15, 2008", 7 pgs.
"European Application Serial No. 07250899.7, Office Action Mailed Jan. 15, 2009", 1 pgs.
"European Application Serial No. 07250899.7, Office Action mailed Mar. 21, 2011", 3 pgs.
"European Application Serial No. 07250899.7, Response filed Jul. 13, 2009 to Office Action mailed Jan. 15, 2009", 17 pgs.
"European Application Serial No. 07250899.7, response filed Sep. 5, 2011 to Office Action mailed Mar. 21, 2011", 25 pgs.
"European Application Serial No. 07839766.8, Response filed Jan. 11, 2013 to Office Action mailed Sep. 17, 2012", 16 pgs.
"European Application Serial No. 07839767.6, Office Action mailed Mar. 8, 2012", 27 pgs.
"European Application Serial No. 07839767.6, Amendment filed Jun. 2, 2011", 11 pgs.

(56) References Cited

OTHER PUBLICATIONS

"European Application Serial No. 07839767.6, Decision to Grant mailed Jul. 19, 2012", 2 pgs.

"European Application Serial No. 07839767.6, Office Action mailed May 5, 2011", 4 pgs.

"Inspiria Ultimate—GA3285", [Online]. Retrieved from the Internet: <URL: http://www.sounddesigntechnologies.com/products_InspiriaUltimate.php>, (Accessed Jun. 18, 2009), 4 pgs.

"International Application Serial No. PCT/US2007/022548, International Preliminary Report on Patentability mailed May 7, 2009", 8 pgs.

"International Application Serial No. PCT/US2007/022548, Search Report mailed Jun. 3, 2008", 7 pgs.

"International Application Serial No. PCT/US2007/022548, Written Opinion mailed Jun. 3, 2008", 8 pgs.

"International Application Serial No. PCT/US2007/022549, International Preliminary Report on Patentability mailed May 7, 2009", 8 pgs.

"International Application Serial No. PCT/US2007/022549, International Search Report and Written Opinion mailed Feb. 15, 2008", 12 pgs.

Chankawee, A., et al., "Performance improvement of acoustic feedback cancellation in hearing aids using liner prediction", Digital Signal Processing Research Laboratory(DSPRL), (Nov. 21, 2004), 116-119.

Haykin, Simon, "Adaptive Filter Theory: Third Edition: Appendix G Gradient Adaptive Lattice Algorithm", Prentice Hall, (1996), 5 pgs.

Maxwell, J. A., et al., "Reducing Acoustic Feedback in Hearing Aids", IEEE Transactions on Speech and Audio Processing, 3(4), (Jul. 1995), 304-313.

Proakis, J. G, et al., "Digital Signal Processing", Prentice-Hall, Inc., XP002481168, (1996), 5 pgs.

Rife, D., et al., "Transfer-Function Measurement With Maximum-Length Sequences", J. Audio Eng. Soc., 37(6), (1989), 419-444.

Spreiet, Ann, et al., "Adaptive Feedback Cancellation in Hearing Aids With Linear Prediction of the Desired Signal", IEEE Transactions on Signal Processing 53(10), (Oct. 2005), 3749-3763.

Theverapperuma, Lalin S, et al., "Adaptive Feedback Canceller: Entrainment", Digital Signal Processing Workshop, 4th IEEE, PI, (Sep. 1, 2006), 245-250.

Theverapperuma, Lalin S, et al., "Continuous Adaptive Feedback Canceller Dynamics", Circuits and Systems, MWSCAS 2006. 49th IEEE International Midwest Symposium on Circuits and Systems, (Aug. 1, 2006), 605-609.

Theverapperurna, Lalin S, et al., "Adaptive Feedback Canceller: Entrainment", Digital Signal Processing Workshop, 12th—Signal Processing Education Workshop, 4th, IEEE, (2006), 245-250.

"U.S. Appl. No. 10/857,599, Examiner Interview Summary Jul. 16, 2010", 1 pgs.

"U.S. Appl. No. 11/877,567, Examiner Interview Summary mailed May 31, 2012", 1 pgs.

"U.S. Appl. No. 12/875,646, Advisory Action mailed Mar. 2, 2015", 2 pgs.

"U.S. Appl. No. 12/875,646, Final Office Action mailed Oct. 24, 2014", 10 pgs.

"U.S. Appl. No. 12/875,646, Final Office Action mailed Nov. 13, 2015", 12 pgs.

"U.S. Appl. No. 12/875,646, Non Final Office Action mailed Jul. 17, 2015", 11 pgs.

"U.S. Appl. No. 12/875,646, Response filed Jan. 13, 2016 to Final Office Action mailed Nov. 13, 2015", 9 pgs.

"U.S. Appl. No. 12/875,646, Response filed Jan. 26, 2015 to Final Office Action mailed Oct. 24, 2014", 8 pgs.

"U.S. Appl. No. 12/875,646, Response filed Sep. 25, 2014 to Non Final Office Action mailed Jun. 25, 2014", 8 pgs.

"U.S. Appl. No. 12/875,646, Response filed Oct. 19, 2015 to Non Final Office Action Jul. 17, 2015", 8 pgs.

"U.S. Appl. No. 13/085,033, Corrected Notice of Allowance mailed Sep. 19, 2014", 4 pgs.

"U.S. Appl. No. 13/085,033, Notice of Allowance mailed Aug. 12, 2014", 9 pgs.

"U.S. Appl. No. 13/085,042, Notice of Allowance mailed Sep. 22, 2014", 5 pgs.

"U.S. Appl. No. 14/223,669, Non Final Office Action mailed Nov. 21, 2014", 24 pgs.

"U.S. Appl. No. 14/223,669, Notice of Allowance mailed Jul. 9, 2015", 14 pgs.

"U.S. Appl. No. 14/223,669, Response filed Mar. 23, 2015 to Non Final Office Action mailed Nov. 21, 2014", 8 pgs.

"U.S. Appl. No. 14/579,100, Preliminary Amendment filed Dec. 23, 2015", 6 pgs.

OUTPUT PHASE MODULATION ENTRAINMENT CONTAINMENT FOR DIGITAL FILTERS

RELATED APPLICATIONS

This application is a continuation of U.S. patent application Ser. No. 14/105,269, filed on 13 Dec. 2013, which application is a continuation of and claims the benefit of priority under 35 U.S.C. §120 to U.S. patent application Ser. No. 12/980,720, filed Dec. 29, 2010, which application is a divisional of and claims the benefit of priority under 35 U.S.C. §120 to U.S. patent application Ser. No. 11/276,763, filed on Mar. 13, 2006, which applications are hereby incorporated by reference herein in their entirety.

TECHNICAL FIELD

This disclosure relates to digital filters used for feedback and echo cancellation, and in particular to method and apparatus for digital filters employing entrainment containment.

BACKGROUND

A feedback canceller or an echo canceller is a system that eliminates, as much as possible, the output of a system from re-entering its input. In the case of an audio system having a microphone, an audio processing unit and a speaker (or any other audio transducer), it is known that the output signal can leave the speaker and come back to the input microphone by means of a physical acoustic path. This physical path where the output sound waves can propagate back to the input of the system is usually referred as "acoustic feedback path".

The reentrant signal can be perceived as an echo if the feedback path delay is long and the gain is low. This is usually the case of telecommunication systems such as speakerphones. The system used to reduce such artifact is usually known as echo canceller.

If the feedback delay is shorter, but the loop gain is greater than one, it may cause a sustained oscillation. This is usually the case of hearing aids and amplified mic/headset pairs. It is perceived as a loud whistle, which forces the user to remove the apparatus from his/her ears. It can also be perceived as a ringing artifact if the oscillation gets attenuated. The system used to reduce such artifacts is usually known as feedback canceller.

Both echo canceller and feedback canceller are usually implemented as an adaptive system, whose goal is to match the system response of the acoustic feedback path. If the acoustic feedback path can be estimated, the feedback signal can also be estimated by supplying it with the output of the system.

When an acoustic feedback control system is stimulated with a sinusoidal signal from the environment in an adaptive digital filter, the adaptive algorithm will correlate the output of the filter with the feedback signal and with the stimulus signal itself. This will cause a degraded response to the feedback signal. This phenomenon is called "entrainment" as the feedback canceller gets entrained by the stimulus signal. It happens with signals that have high autocorrelation between samples, such as sinusoidal signals and other periodic signals.

The entrainment causes several effects upon the performance of the feedback canceller:

a. Entrainment degrades the estimate of the feedback signal, because its response gets distracted to the autocorrelated signal input. Therefore, the system has decreased feedback cancellation.

b. Entrainment causes attenuation of the input stimulus signal.

c. Entrainment increases the instability of the system. Once the periodic input stimulus is removed, the entrained system might immediately act as a feedback generator itself, which can cause sustained oscillation. This condition can get worse the longer the periodic input signal is allowed to stimulate the system, as the coefficients of some filter designs can grow indefinitely.

d. Entrainment degrades the response of a longer digital filter. Under entrainment, the longer the digital filter, the worse its response because the smaller coefficients at the tail of the filter are more sensitive to get mistuned by the entraining input signal.

What is needed in the art is an improved system for avoiding or containing entrainment of digital filter designs. The system should be straightforward to implement in a variety of applications.

SUMMARY

The above-mentioned problems and others not expressly discussed herein are addressed by the present subject matter and will be understood by reading and studying this specification.

The present subject matter provides method and apparatus for entrainment containment of digital filter systems. The present subject matter relates to time domain and frequency domain embodiments for entrainment containment of digital filter systems. Several embodiments are provided which relate to digital filters for acoustic feedback reduction. Some applications include hearing assistance devices, such as hearing aids.

For example, one such apparatus includes a sensor to receive sound and convert it to an electrical signal; an analog-to-digital converter to convert the electrical signal into a digital signal; a summing node receiving the digital signal and an acoustic feedback compensation signal Y(z) adapted to correct for acoustic feedback received by the sensor, the summing node providing an error signal E(z) by subtraction of the acoustic feedback compensation signal Y(z) from the digital signal; a signal processing module and a phase adjustment module processing the error signal E(z) in series to produce an output signal X(z); an adaptive filter including an adaptive algorithm receiving the error signal E(z), the adaptive filter producing the feedback compensation signal Y(z); a digital-to-analog converter providing an analog version of the output signal X(z); and a receiver to output processed sound from the analog version, wherein the phase adjustment module gradually changes phase applied to the output signal X(z). Various embodiments including phase adjustment modules which gradually changes phase between zero and 180 degrees are provided. One such module includes an all-pass filter. Various phase shift increments are performed from about 0.25 degrees to 25 degrees. Embodiments of 0.25 and 4, and 25 degree increments are some examples. Some examples include programmable phase changes.

Another example provided has a phase adjustment module which gradually changes phase between zero and 360 degrees. One such example is a pair of all-pass filters. Various phase shift increments are performed from about 0.25 degrees to 25 degrees. Embodiments of 0.25 and 4, and 25 degree increments are some examples. Some examples include programmable phase changes.

Frequency domain embodiments are also provided. Some applications include hearing assistance devices, such as hearing aids. One such application includes a sensor to receive sound and convert it to an electrical signal; an analog-to-digital converter to convert the electrical signal into a digital signal; a frequency analysis module to produce frequency domain subband signals from the digital signal; a summing node receiving the frequency domain subband signals and acoustic feedback compensation subband signals AFC(k) adapted to correct for acoustic feedback received by the sensor, the summing node providing error subband signals E(k) by subtraction of the received signals; a complex multiplier producing a gradually phase shifted version of the error subband signals E'(k); a signal processing module to process the phase shifted error subband signals E'(k); a time synthesis module to produce time domain, processed, digital signals; a digital-to-analog converter providing an analog version of the processed, digital signals; and a receiver to produce processed sound from the analog version; wherein the processed, digital signals are passed through a bulk delay and converted back into frequency domain signals to be used for acoustic feedback cancellation by an adaptive filter which produces the acoustic feedback compensation subband signals AFC(k).

Various phase adjustments may be made, for example, in some embodiments the multiplier receives a gradually shifted phase signal from a phase shifter, and the phase shifter module resets when reaching an aggregate phase of 360 degrees. Various phase increments include 4 degrees, 0.25 degrees, 25 degrees, or any phase between about 0.25 degrees to about 25 degrees. Various time-domain to frequency domain transformations can be used, including FFT, and its inverse, the IFFT, can be used to get back into the time domain. In some examples the time and/or frequency analysis modules include a weighted overlap-add structure. Different adaptive filters designs may be used, such as an LMS adaptive filter design.

Methods for entrainment containment are also provided. One method for entrainment containment, includes converting an analog sound signal into a digital signal; processing the digital signal using an acoustic feedback reduction loop; gradually changing phase of a forward feed of the feedback reduction loop; converting the processed digital signals into analog signals; and generating sound from the analog time domain signals.

Different phase changes are possible. In one example, phase is changed at about 4 degree increments per sample. In one example, phase is changed at about 0.25 to about 25 degree increments per sample. In various applications, larger phase shift increments are used to achieve more aggressive entrainment containment. In various applications, smaller phase shift increments are used to reduce artifacts.

Some frequency domain methods include converting analog sound signals into a plurality of digital, frequency domain subband signals; processing a gradually phase shifted version of the digital, frequency domain subband signals to create processed digital, frequency domain signals to reduce entrainment; converting the processed digital, frequency domain signals into analog time domain signals; and generating sound from the analog time domain signals. Some applications include gradually incrementing phase of the digital, frequency domain subband signals at 4 degree increments per sample. Some applications include gradually incrementing phase of the digital, frequency domain subband signals at about 0.25 to about 25 degree increments per sample. In some applications, larger phase shift increments are used to achieve more aggressive entrainment containment. In some applications, smaller phase shift increments are used to reduce artifacts.

This Summary is an overview of some of the teachings of the present application and not intended to be an exclusive or exhaustive treatment of the present subject matter. Further details about the present subject matter are found in the detailed description and appended claims. Other aspects will be apparent to persons skilled in the art upon reading and understanding the following detailed description and viewing the drawings that form a part thereof, each of which are not to be taken in a limiting sense. The scope of the present invention is defined by the appended claims and their legal equivalents.

DETAILED DESCRIPTION

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

The present subject matter relates to methods and apparatus for entrainment containment in digital filter designs. The principles provided by this disclosure may be applied in the time domain or in the frequency domain. They may be applied in a variety of apparatus, including, but not limited to hearing assistance devices. Although the examples set forth herein relate to hearing assistance devices, those of skill in the art will understand other applications and variations falling within the scope of the present subject matter upon reading and understanding this specification. The method and apparatus set forth herein are demonstrative of the principles of the invention, and it is understood that other method and apparatus are possible using the principles described herein.

Time Domain Examples

Figure 1:
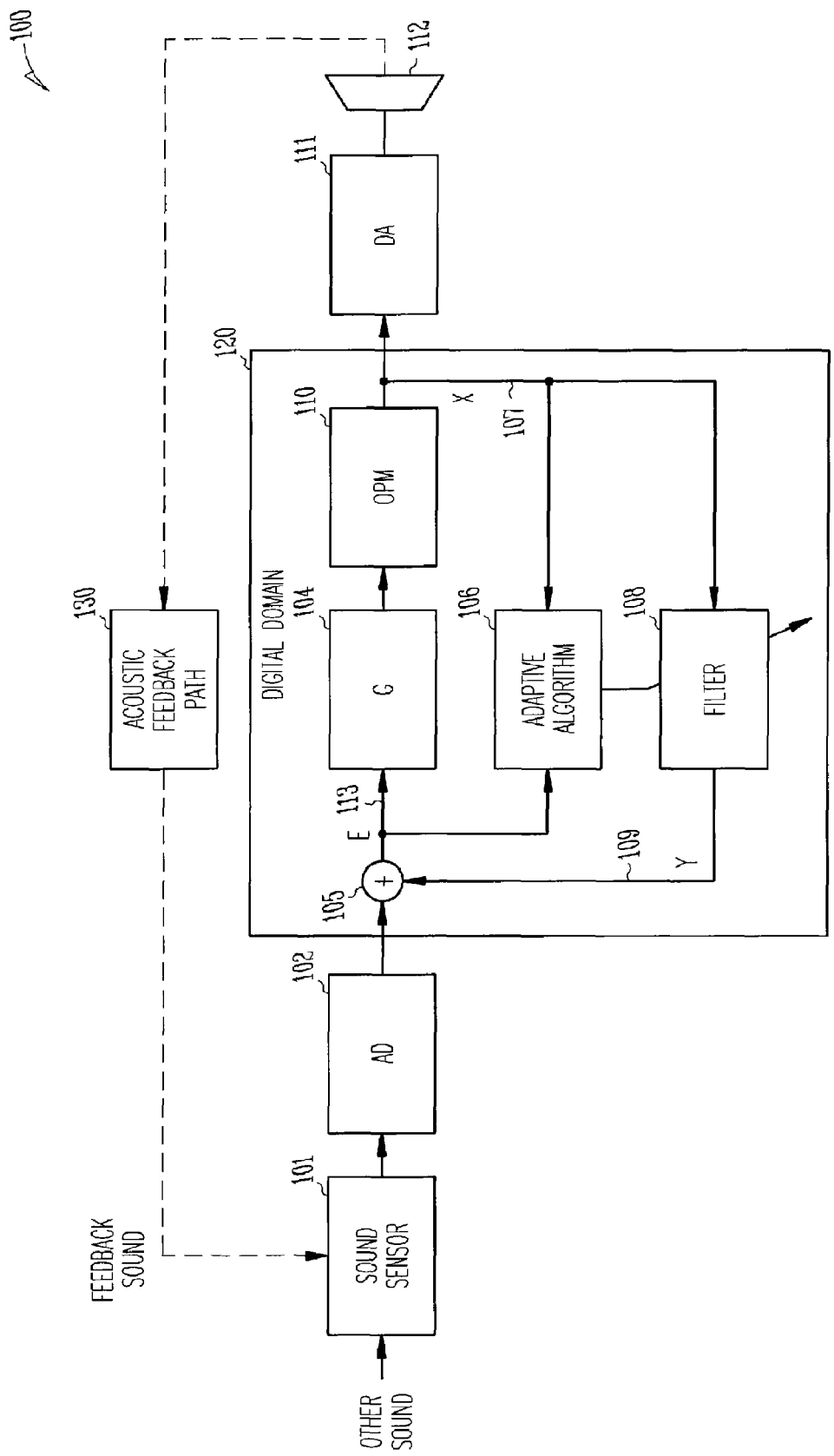
FIG. 1 shows one example of signal processing in a time-domain output phase modulator approach, according to one embodiment of the present subject matter.

FIG. 1 demonstrates one example of an acoustic feedback cancellation system using a novel output phase modulation according to one embodiment of the present subject matter. This system 100 can be adapted for use in audio applications, including but not limited to, hearing assistance devices. One application involving hearing assistance devices is the use of hearing aids. In such an application, the sound sensor 101 is a microphone or other acoustic sensor for receiving sound and converting it into electrical signals. Sensor 101 receives sound via the acoustic feedback path 130 and other sounds from outside the system. Acoustic feedback path 130 represents sound from the audio source 112 that reaches sensor 101, thus making a closed loop feedback of acoustic sound. The audio source 112 is a receiver (also known as a speaker) for creating sound based on electrical signals presented to it. Applications besides hearing assistance devices are possible which employ the principles set forth herein.

The AD block 102 of system 100 converts an analog input signal into a digital output signal. In various embodiments, the AD block 102 includes an analog-to-digital converter and may include various amplifiers or buffers to interface with sensor 101. Digital signals representing the superposition of acoustic feedback and other sounds are processed by the closed loop system of block 120.

The DA block 111 converts the incoming digital signal into an analog output signal. In various embodiments, the DA block 111 includes an digital-to-analog converter and may include various amplifiers or signal conditioners for conditioning the analog signal for the audio source 112. In hearing assistance devices, such as hearing aids, the audio source is called a "receiver." In other applications the audio source may be a speaker or other sound transducer.

Block 120 represents a simplified flow of the digital signal processing of input signals from AD block 102. In one embodiment, block 120 is implemented using a digital signal processor (DSP) for echo cancellation/feedback cancellation in the digital domain. The filter 108 is used to emulate the acoustic feedback path 130 in the digital domain. In various embodiments, an adaptive algorithm, such as an LMS algorithm (least mean squares algorithm) 106 is used to tune the filter 108 response such that it matches the acoustic feedback path 130 response. The estimated feedback signal, Y(z), 109 can then be generated by applying the output of the system, X(z), 107 to the filter 108. The estimated feedback signal Y(z) 109 is subtracted from the input signal in the digital domain using summer 105, therefore reducing the effects of the acoustic feedback path 130.

Module 104 includes various different types of signal processing that the system may employ. For example, in cases where the signal processing is for a hearing assistance device, module 104 is adjusted for the best hearing of the wearer of the device. In cases where the hearing assistance device is a hearing aid, module 104 provides hearing aid signal processing. Such processing is known to include adjustments of gain and phase for the benefit of the hearing aid user.

In one embodiment, filter 108 is a FIR filter (finite impulse response filter). Thus, an adaptive algorithm, such as the LMS algorithm is used to tune the FIR coefficients based on the correlation of the input error signal E(z) 113 and the output of the system X(z) 107. In various embodiments, a bulk delay line is inserted between the output of the system and the FIR input, if the FIR is not long enough to accommodate the feedback path length, therefore being truncated. In one embodiment, filter 108 is an IIR filter (infinite impulse response filter). Other filters may be used without departing from the scope of the present subject matter.

It is understood that the LMS algorithm is not the only adaptive algorithm that can be used. Other such algorithms include, but are not limited to N-LMS and filtered X-LMS algorithms. The N-LMS algorithm is a variation of the LMS algorithm which also uses the power of both E(z) and X(z) signals to adjust the tuning step of the FIR filter, which is based on the correlation of the same two signals. The filtered-X LMS algorithm is a variation of the LMS algorithm which uses filtered X(z) and E(z) samples to generate the correlation to tune the filter 108.

Output phase modulator 110 is used to adjust the phase of the output of module 104 in the feedback loop to contain entrainment of the filter 108. It was discovered that by controlled adjustment of phase of the output signal X(z), entrainment of the filter 108 can be reduced or avoided. The process can avoid coefficient drift caused by entrainment and can correct coefficients that have drifted due to an onset of entrainment. Various embodiments will be provided herein to show how phase may be adjusted to avoid entrainment.

Output Phase Modulator Using 180 Degree Switching

One embodiment of the output phase modulator switches phase 180 degrees every half period of a periodic cycle time, T. One way to do this is using the following approach:

```
sample_count = 0
For every new output sample out(n)
    if (sample_count < T/2)
        out(n) = out(n) // Don't do anything
    else
        out(n) = -out(n) // Reverse the output, 180 degrees out of phase
        if (sample_count=T)
            sample_count=0
        endif
    endif
    sample_count = sample_count + 1
```

By this approach, the same reversed output signal is applied to the filter 108 as well as the acoustic feedback path 130. This causes the filter 108 coefficients to keep the same correlation to the acoustic feedback path response, but it reverses the correlation of the same coefficients to the periodic input stimulus. The reversed correlation to the periodic input stimulus will cause the coefficients to move to the opposite direction, therefore canceling the previous entrainment drift. In this way, the entrainment effect is contained by making the coefficients to move back and forth around the correct values, instead of allowing them to drift to improper (entrained) values.

The output phase reversal in its basic version as described above illustrates its working principles, but, because of the abrupt change it causes in the phase of the signal, it generates audible artifacts.

Another implementation of the output phase modulator 110 looks for opportunities to change the phase, where it will not cause artifacts, thereby being unperceivable to the user. These windows of opportunity happen when there is "notch" in the signal power envelope. A notch detector constantly monitors the power envelope of the signal, and when it detects a notch, it flags the system an opportunity to reverse the phase.

One implementation of the notch detector is to run two signal envelope detectors, a slow one and a fast one. The magnitude of the slow envelope detector is compared to the magnitude of the fast envelope detector by means of division (or division approximation). In a variation of this embodiment, subtraction of the outputs of the two signal envelope detectors may be used. The difference is a metric of the relationship between the slow one and the fast one. Other comparisons may be performed without departing from the scope of this subject matter.

If the slow envelope magnitude is bigger than the power of the fast enveloped magnitude by a certain threshold value, a notch is detected.

The system described above works well for inputs having notches, such as for speech signals and music signals. But not as effectively on steady, constant amplitude sinusoidal inputs as they lack power envelope notches. The next embodiment provides an approach to accommodate different input signals.

Single Stage Output Phase Modulator

Figure 2:
FIG. 2 shows one example of an all-pass filter for use in a time-domain output phase modulator approach, according to one embodiment of the present subject matter.
Figure 3:
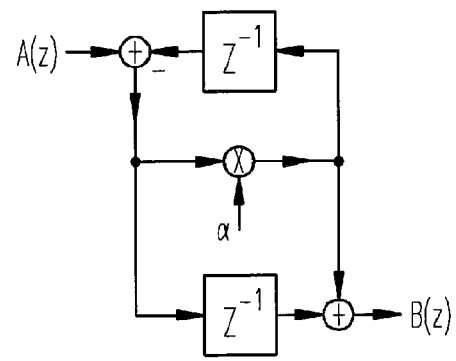
FIG. 3 shows one example of an all-pass filter for use in a time-domain output phase modulator approach, according to one embodiment of the present subject matter.

FIG. 2 shows a block diagram of a single stage approach to output phase modulation employing an all-pass filter. In one embodiment, the single all-pass filter is capable of different amounts of phase shift, and up to 180 degrees of phase shift. One such all-pass filter is shown in FIG. 3. This embodiment uses a single coefficient, α, as a control of the overall phase adjustment. As α is adjusted from +1 to −1, phase is shifted from 0 degrees to 180 degrees. The system is stable and distortion free as long as α is varied in small increments. The transfer function for the embodiment of FIG. 3 is:

$$H(z)=(1+\alpha^*z)/(z+\alpha).$$

The relationship between α and phase shift caused by alpha is non-linear and described by the equation:

$$\text{Phase shift}=-2A\ \text{TAN}\ [((1-\alpha)/(1+\alpha))^*\text{TAN}(M^*\theta/2)],$$

where θ is frequency in radians.

Thus, a first order all-pass filter can be used to smoothly change the phase shift from 0 to 180 degrees by varying α from +1 to −1 and then back from −1 to +1. The α increment (or step size) produces a nonlinear phase shift, and so the empirical equation for α is:

$$\alpha=2.0156^*(2^\hat{}q/2\ \hat{}7)-1.0156,$$

where q varies from 7 to 0 in small steps.

Figure 4:
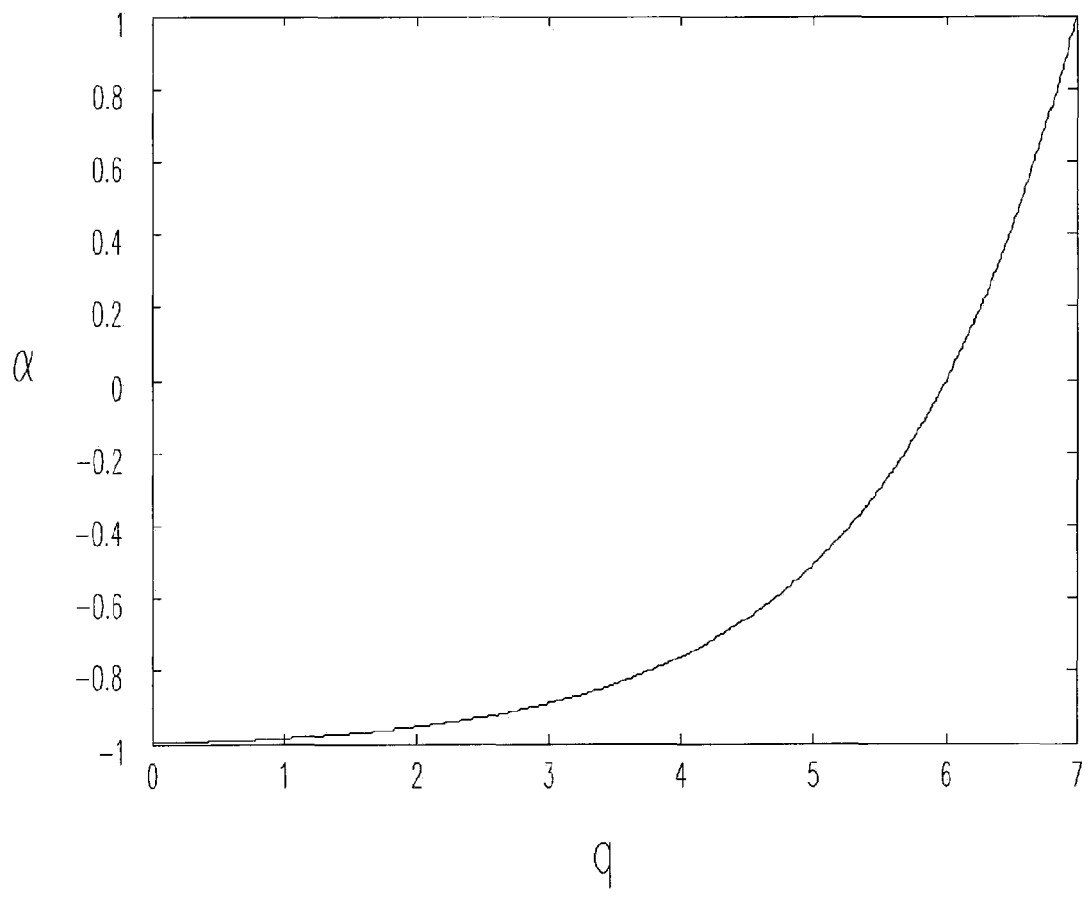
FIG. 4 shows a mapping of a variable q to variable a, for use to control an all-pass filter for use in a time-domain output phase modulator approach, according to one embodiment of the present subject matter.

FIG. 4 is a chart showing a nonlinear mapping of variable q to α. One example of q varying in small steps is q varying by 0.001. Some examples of q and α in the extreme are:

when q=7, α=1; and
when q=0, α=−1.

In various embodiments, the system smoothly changes the phase of the output: from 0 degrees to 180 degrees, and then from 180 degrees back to 0 degrees. In some embodiments, this system smoothly sweeps the phase shift from 0 to 180, going through several intermediate values (1, 2, 3 . . . , 179, 180).

In various embodiments, different incremental changes in phase are employed. In one embodiment, phase change increments of 0.25 degrees to 25 degrees are programmable. In various embodiments, a fixed phase change increment is employed. In one embodiment, a phase change of 4 degree increments is used. In one embodiment, a phase change of 0.25 degree increments is used. In one embodiment, a phase change of 25 degree increments is used. The greater the phase change increment, the faster entrainment is compensated for and the larger the audible artifacts. Thus, smaller phase changes result in lower artifacts, but in slower compensation for entrainment. If transitions are made slowly, the transitions cause no perceivable artifacts. Other embodiments are possible without departing from the scope of the present subject matter.

Implementations using all-pass filters change the phase of the input signal without changing its magnitude. The amount of phase shift can be controlled by slowly changing the coefficient(s) of the filter.

Figure 6:
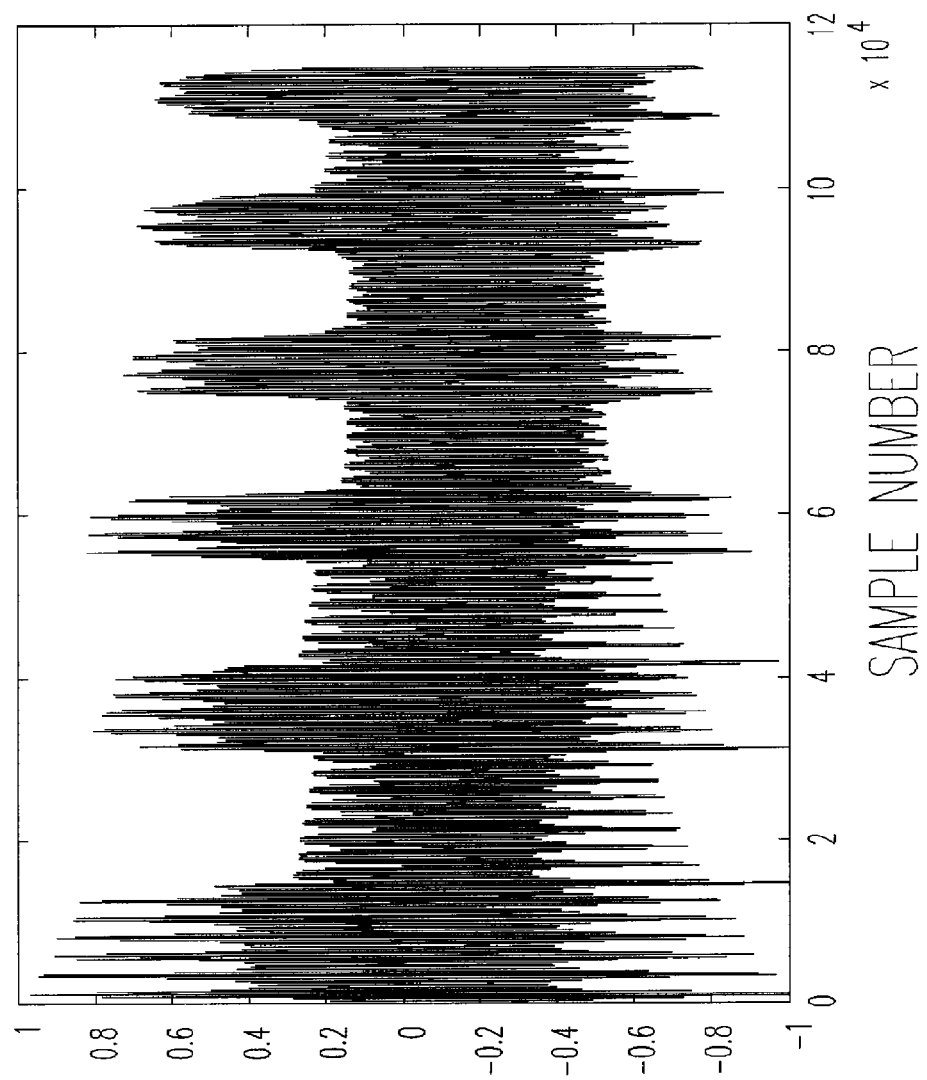
FIGS. 6, 8, and 10 demonstrate entrainment of a hearing assistance device upon reception of room noise and a 500 Hz tone and with the output phase modulator deactivated.
Figure 7:
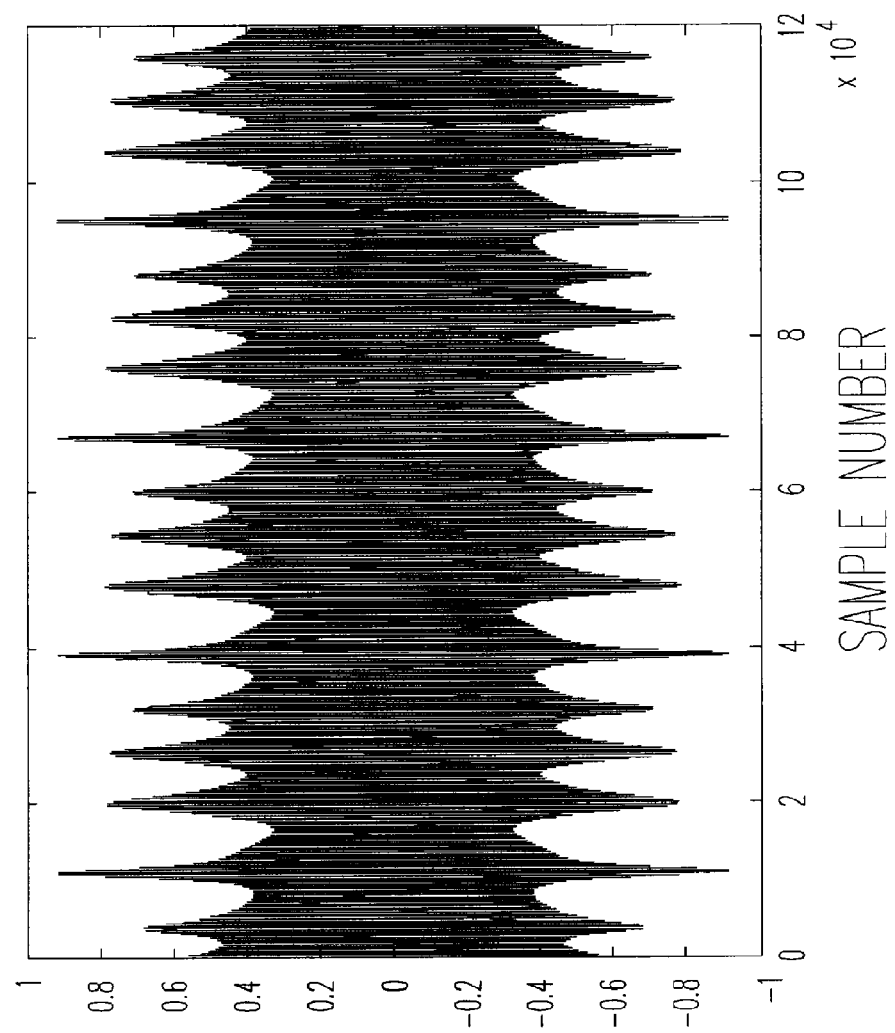
FIGS. 7, 9, and 11 show a reduction in entrainment of an output phase modulator operating on the same systems as FIGS. 6, 8 and 10, respectively.

FIGS. 6 and 7 demonstrate efficacy of the single stage embodiment. These figures show an output of a digital signal processing system of a hearing aid sampling at 16 KHz (simulation) receiving a 500 Hz tone to demonstrate the effects of the algorithm on entrainment. FIG. 6 shows the hearing aid where the filter 108 is entrained by the 500 Hz tone. FIG. 7 shows what happens when the present algorithm is enabled, thereby eliminating entrainment.

Two-stage Output Phase Modulator

Figure 5:
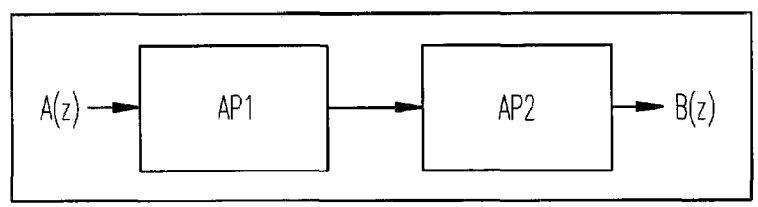
FIG. 5 shows one example of a series of all-pass filters for use in a time-domain output phase modulator approach, according to one embodiment of the present subject matter.

FIG. 5 shows a two-stage series of all-pass filters to achieve a 360 degree phase shift. The input is A(z) and the ultimate output is B(z). In varying embodiments, the first and second filters operate as follows: Both filters start off at zero degrees, then the first all-pass filter begins sweeping from zero to 180 degrees. Once the first filter sweeps to 180 degrees, it stays there and the second filter begins sweeping from zero to 180 degrees. The aggregate phase shift of the series filters is 360 degrees. Upon reaching 360 degrees the second all-pass filter begins sweeping back to zero degrees. Upon reaching zero degrees, the second all-pass filter stops sweeping and the first all-pass filter starts sweeping from 180 degrees towards zero degrees. When both filters are at zero degrees the process starts over again.

It is understood that any number of combinations of filter adjustments designed to provide unity gain and sweeps from zero to 360 degrees total are provided by the disclosed structure. It is understood that the exact order of sweeping can vary without departing from the scope of the principles set forth herein.

In various embodiments, different incremental changes in phase are employed. In one embodiment, phase change increments of 0.25 degrees to 25 degrees are programmable. In various embodiments, a fixed phase change increment is employed. In one embodiment, a phase change of 4 degree increments is used. In one embodiment, a phase change of 0.25 degree increments is used. In one embodiment, a phase change of 25 degree increments is used. The greater the phase change increment, the faster entrainment is compensated for and the larger the audible artifacts. Thus, smaller phase changes result in lower artifacts, but in slower compensation for entrainment. If transitions are made slowly, the transitions cause no perceivable artifacts. Other embodiments are possible without departing from the scope of the present subject matter.

The equations in the previous section for coefficient α are incorporated here. Now that two filters are used, the equations have an α1 and an α2 (one for each stage). The following algorithm identifies the input of the first filter as x1 and the input of the second filter as y1 (the output of the first filter is y1). The output of the second filter is y2 . The coefficients for phase change of the first filter are a1 and q1 and the coefficients for the second filter are a2 and q2.

An algorithm as follows may be employed:

```
if AlgoON==1
    x1=out;
    % Filter 1
    y1=(x1-yold1)*a1 + xold1;
    xold1=x1;
    yold1=y1;
    % Filter 2
    y2=(y1-yold2)*a2 + xold2;
    xold2=y1;
    yold2=y2;
    final_out=y2;
    % Update alpha
    % Find next q
    if f1==1
        q1=q1+inc1;
        if (q1>=7)
            q1=7;
            inc1=-inc1;
            f1=0;
            f2=1;
        elseif (q1<=0)
            q1=0;
            inc1=-inc1;
            f1=0;
            f2=1;
        end
    end
    if f2==1
        q2=q2+inc2;
        if (q2>=7)
            q2=7;
            inc2=-inc2;
            f2=0;
            f1=1;
        elseif (q2<=0)
            q2=0;
            inc2=-inc2;
            f2=0;
            f1=1;
        end
    end
    % Find next alpha
    a1=2.0156*(2^q1/2^7)-1.0156;
    a2=2.0156*(2^q2/2^7)-1.0156;
End
```

Thus, in the first part of a cycle, the first filter gradually changes the phase of the signal from 0 to 180 degrees and the second filter remains static (phase shift at 0 degrees). In the second part of a cycle the first filter now remains static at 180 degrees phase shift, and now the second filter sweeps from 0 to 180 degrees. In the third part of the cycle, the first filter sweeps from 180 degrees back to 0 degrees while the second filter remains static at 180 phase shift. In the last and fourth part of the cycle, the first filter remains static at 0 degrees, and the second filter sweeps from 180 degrees back to 0 degrees. The whole pattern repeats again for every T samples.

Figure 8:
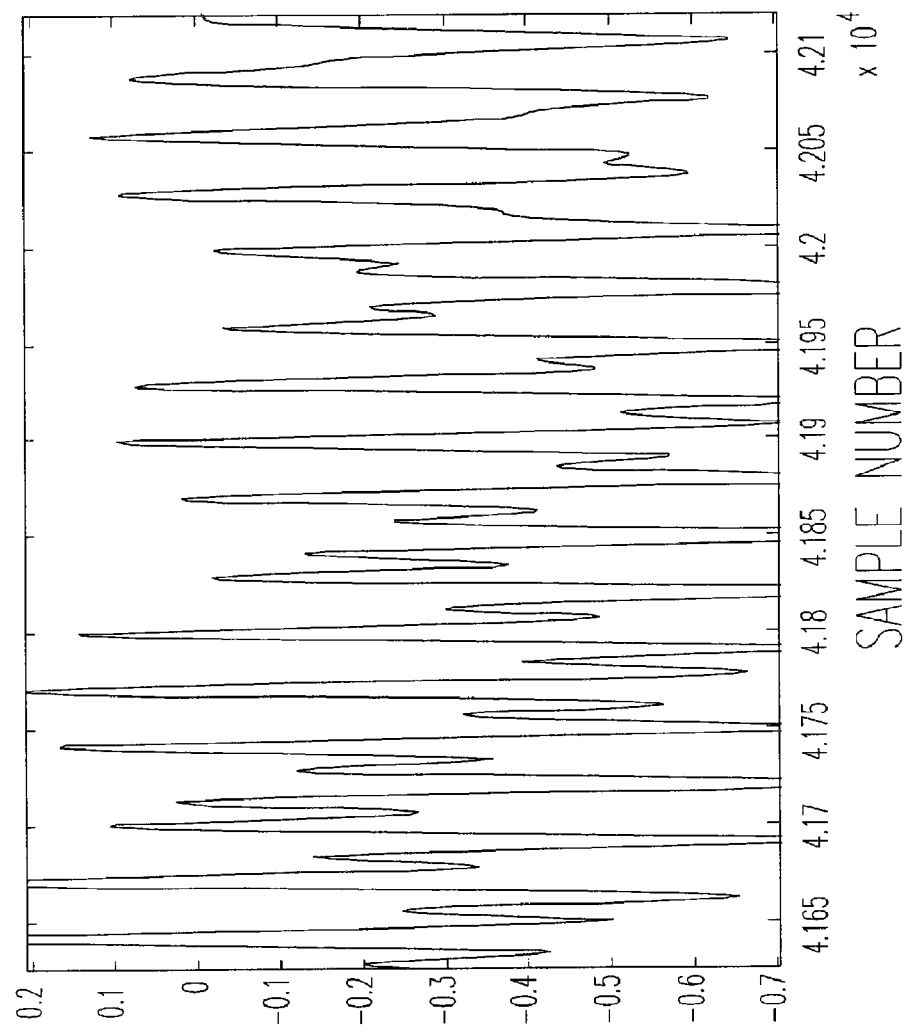
Figure 9:
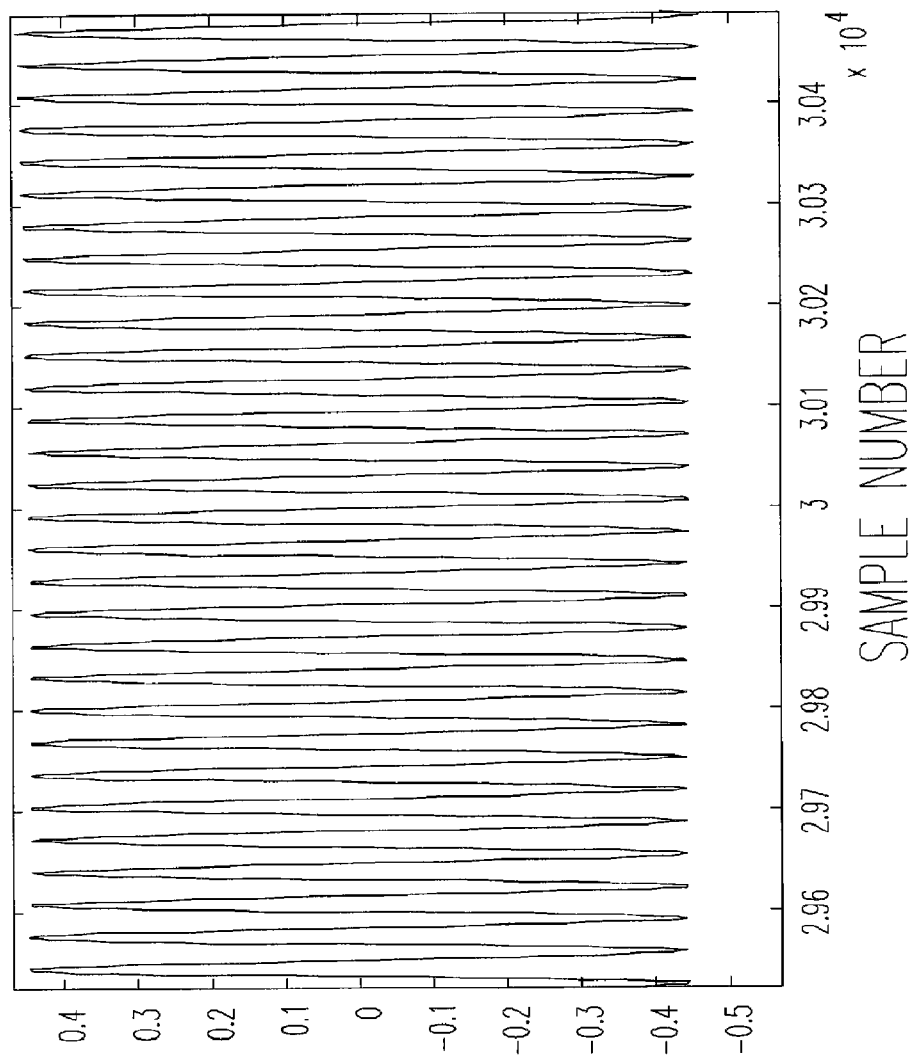
Figure 10:
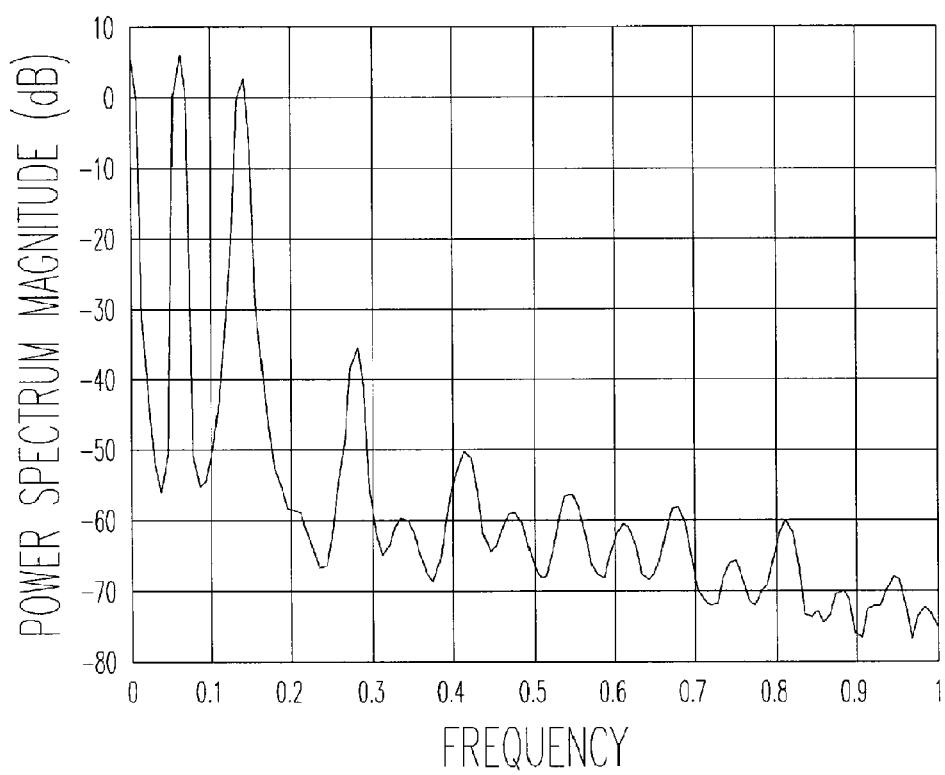
Figure 11:
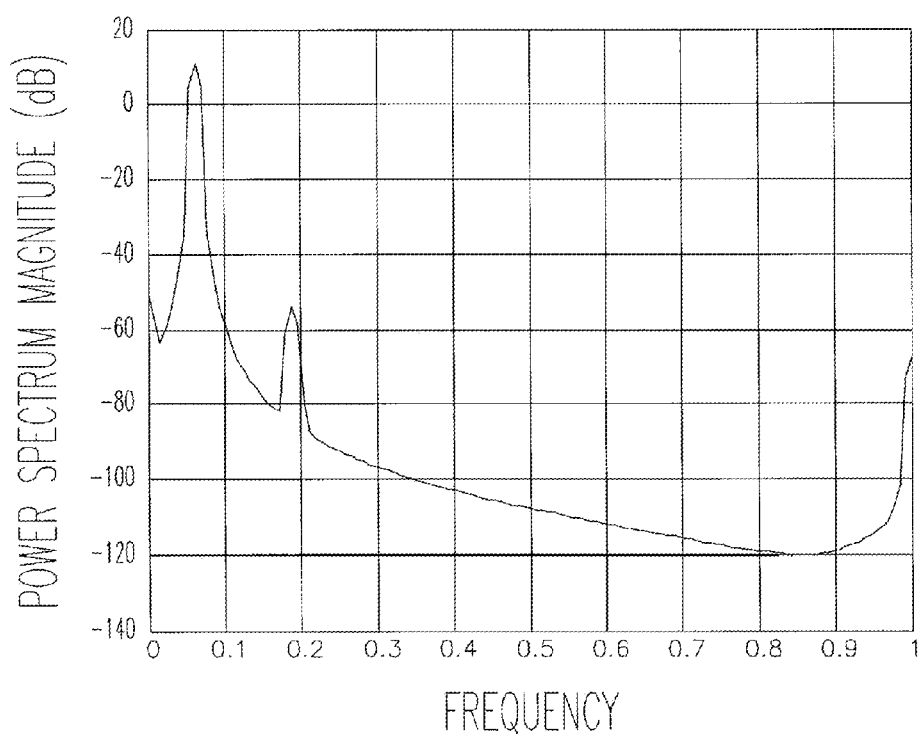

FIGS. 8 to 11 demonstrate efficacy of the two-stage embodiment. These figures show an output of a digital signal processing system of a hearing aid sampling at 16 KHz (simulation) receiving a 500 Hz tone to demonstrate the effects of the algorithm on entrainment. FIG. 8 shows an envelope of the output of the hearing aid without the present algorithm. In FIG. 8, it can be seen that extra frequency is introduced during entrainment. FIG. 9 shows the effect of activating the algorithm, which, besides envelope modulation, presents only the sinusoid with no extra frequency introduced. FIGS. 10 and 11 are before and after spectral graphs of the output of the hearing aid without and with, respectively, the algorithm on. It is straightforward to see entrainment and extra harmonics output by the hearing aid without the present algorithm running on the hearing aid (FIG. 10). The entrainment is gone after the algorithm is turned on (FIG. 11). Thus, efficacy of the approach is established.

Frequency Domain Examples

Figure 12:
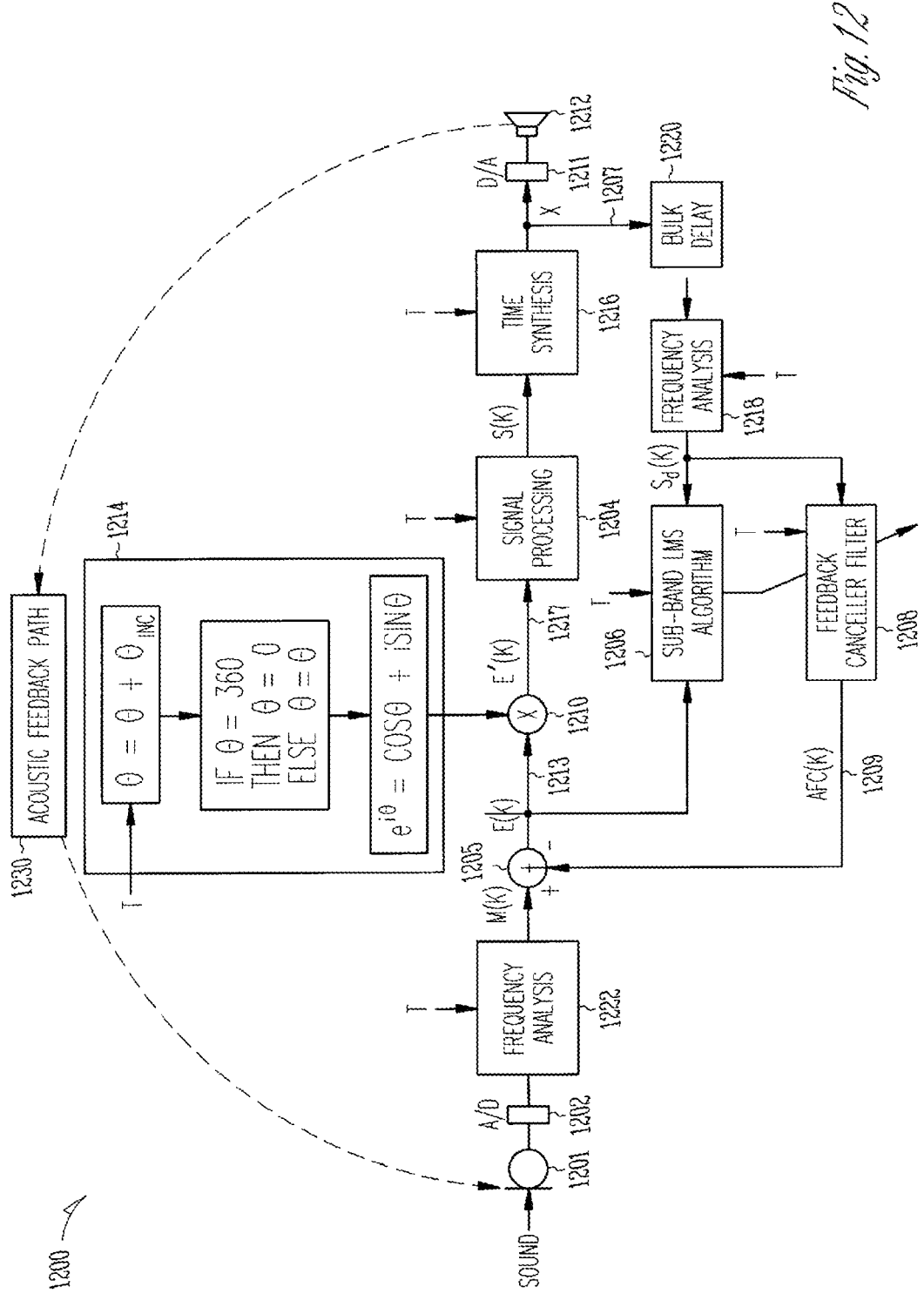
FIG. 12 is a frequency domain approach to containing entrainment using output phase modulation, according to one embodiment of the present subject matter.

FIG. 12 shows one embodiment of an output phase modulation approach in the frequency domain. This system 1200 can be adapted for use in audio applications, including but not limited to, hearing assistance devices. One application involving hearing assistance devices is the use of hearing aids. In such an application, the sound sensor 1201 is a microphone or other acoustic sensor for receiving sound and converting it into electrical signals. Sensor 1201 receives sound via the acoustic feedback path 1230 and other sounds from outside the system. Acoustic feedback path 1230 represents sound from the audio source 1212 that reaches sensor 1201, thus making a closed loop feedback of acoustic sound. The audio source 1212 is a receiver (also known as a speaker) for creating sound based on electrical signals presented to it. Applications besides hearing assistance devices are possible which employ the principles set forth herein.

The AD block 1202 of system 1200 converts an analog input signal into a digital output signal. In various embodiments, the AD block 1202 includes an analog-to-digital converter and may include various amplifiers or buffers to interface with sensor 1201. Digital signals representing the superposition of acoustic feedback and other sounds are processed by the closed loop system 1200.

The DA block 1211 converts the incoming digital signal into an analog output signal. In various embodiments, the DA block 1211 includes a digital-to-analog converter and may include various amplifiers or signal conditioners for conditioning the analog signal for the audio source 1212. In hearing assistance devices, such as hearing aids, the audio source is called a "receiver." In other applications the audio source may be a speaker or other sound transducer.

FIG. 12 represents a simplified flow of the digital signal processing of signals from sensor 1201 to audio source 1212. The "T" inputs to various modules indicate that such operations are synchronous in one embodiment. In one embodiment, the processing is implemented using a digital signal processor (DSP) for echo cancellation/feedback cancellation in the digital domain. In the present frequency based approach, the frequency analysis modules 1222 and 1218 convert digital, time domain signals into frequency subband signals (subband signals denoted with a "(k)" to indicate that the signal is subdivided into frequency bands for processing). Time synthesis module 1216 converts the subband frequency domain signals into time domain signals. One such approach for conversion includes, but is not limited to, the use of weighted overlap structures for discrete Fourier transforms (DFTs), such as those discussed in *Multirate Digital Signal Processing*, by Ronald E. Crochiere and Lawrence R. Rabiner, Prentice-Hall, 1983, especially at Section 7.2.5, starting on p. 313, the entire book hereby incorporated by reference. One such approach is a fast Fourier transform (FFT) for conversion to the frequency domain and an inverse FFT or IFFT for conversion to the time domain. Other conversion method and apparatus may be employed without departing from the scope of the present subject matter.

The filter 1208 is used to emulate the acoustic feedback path 1230 in the frequency subband digital domain. In various embodiments, an adaptive algorithm, such as a sub-band LMS algorithm (least mean squares algorithm) 1206 is used to tune the filter 1208 response such that it matches the acoustic feedback path 1230 response. The estimated feedback signal, AFC(k) 1209, can then be generated by applying a delayed version of the output of the system, X(z) 1207, to the filter 1208. The bulk delay 1220 provides a time domain delay to X(z) 1207, before converting the signals back into the subband frequency domain using frequency analysis module 1218. The estimated feedback signal, AFC(k) 1209, is subtracted from the input signal m(k) in the subband frequency domain using summer 1205, therefore reducing the effects of the acoustic feedback path 1230.

Module 1204 includes various different types of subband frequency domain signal processing that the system may employ. For example, in cases where the signal processing is for a hearing assistance device, module 1204 is adjusted for the best hearing of the wearer of the device. In cases where the hearing assistance device is a hearing aid, module 1204 provides hearing aid signal processing. Such processing is known to include adjustments of gain and phase for the benefit of the hearing aid user.

In one embodiment, filter 1208 is a FIR filter (finite impulse response filter). Thus, an adaptive algorithm, such as the LMS algorithm is used to tune the FIR coefficients based on the correlation of the input error signal E(k) 1213 and the delayed output of the system X(z) 1207 which is converted to the frequency domain, $S_d(k)$. The bulk delay 1220 is between the output of the system and the FIR input, so that the FIR is long enough to accommodate the feedback path length, without being truncated.

It is understood that the LMS algorithm is not the only adaptive algorithm that can be used. Other such algorithms include, but are not limited to N-LMS and filtered X-LMS algorithms. The N-LMS algorithm is a variation of the LMS algorithm which also uses the power of both E(k) and $S_d(k)$ signals to adjust the tuning step of the FIR filter, which is based on the correlation of the same two signals. The filtered-X LMS algorithm is a variation of the LMS algorithm which uses filtered $S_d(k)$ and E(k) samples to generate the correlation to tune the filter 1208.

Output phase modulator is comprised of phase shifter 1214 and a complex multiplier 1210. The combination is used to adjust the phase of the input of module 1204 in the feedback loop to contain entrainment of the filter 1208. It was discovered that by controlled adjustment of phase of the output signal E'(k) 1217, entrainment of the filter 1208 can be reduced or avoided. The process can avoid coefficient drift caused by entrainment and can correct coefficients that have drifted due to an onset of entrainment. Various embodiments will be provided herein to show how phase may be adjusted to avoid entrainment. In one embodiment, phase shifter 1214 increments phase by a predetermined amount and cycles from 0 to 360 degrees, then starts over again at 0 degrees and increments to 360 degrees.

In various embodiments, different incremental changes in phase are employed. In one embodiment, phase change increments of 0.25 degrees to 25 degrees are programmable. In various embodiments, a fixed phase change increment is employed. In one embodiment, a phase change of 4 degree increments is used. In one embodiment, a phase change of 0.25 degree increments is used. In one embodiment, a phase change of 25 degree increments is used. The greater the phase change increment, the faster entrainment is compensated for and the larger the audible artifacts. Thus, smaller phase changes result in lower artifacts, but in slower compensation for entrainment. If transitions are made slowly (for example, around 1 Hz or less), the transitions cause no perceivable artifacts. Other embodiments are possible without departing from the scope of the present subject matter.

Frequency Domain Enhancements

Various enhancements can be made to the frequency domain embodiments set forth herein. For example, to reduce artifacts, the output phase modulation can be disabled for low frequencies. For example, the processing of certain subbands below a predetermined frequency threshold can disable the output phase modulator, since entrainment is generally not an issue at lower frequencies. In one embodiment, output phase modulation is disabled for frequencies below 1250 Hz. Various frequency thresholds may be used without departing from the scope of the present subject matter. This approach also avoids phase change artifacts which are more noticeable at low frequencies.

Another enhancement to the previous threshold frequency approach is to have a transition band where output phase modulation is optional depending on the energy detected about the frequency of the threshold. This reduces or eliminates audible artifacts arising from phase discontinuities due to switching the device output phase modulation on and off at the threshold frequency. One approach to performing the transition is to window the energy just below the threshold frequency (i.e., window the energy from about 750 Hz to 1250 Hz). As energy increases in the window, program the system to disable output phase modulation at all frequencies and freeze the adaptive filter. As energy decreases, enable the output phase modulation and start adapting the filter again. In one embodiment, a window energy for frequencies between 750 Hz and 1250 Hz is detected and compared with energy found in the other bands. If the energy in the window is greater than the energy in the other bands by 12 dB, then output phase modulation is disabled and adaptation is stopped. If the energy in all bands is less than a threshold energy, then output phase modulation is also disabled and adaptation is stopped.

Other enhancements are possible without departing from the scope of the present subject matter.

The output phase modulation system (OPM), for containing the entrainment effect was presented above. Various embodiments are provided which reduce the phase reversal artifact to unperceivable levels. The proposed embodiments reduce the effect of entrainment upon the filter 108 coefficients and corrects coefficient entrainment drift. The present subject matter improves feedback signal estimation, therefore improving the feedback cancellation. It avoids the attenuation of the input signal. It causes increased system stability by removal of the periodic input signal, the feedback canceller won't act as a feedback generator as before. It avoids the indefinite growth of the coefficients, another cause of system instability when the system is being constantly stimulated by a periodic signal. It also allows longer filter (filter 108 for the frequency domain approach, and/or filter 1208 for the frequency domain approach) to be used; the effect of entrainment upon the smaller tail coefficient is reduced. Other benefits are also enjoyed which are not enumerated expressly herein.

These principles apply not only to the feedback canceller, but also to the echo canceller described above. Other applications may benefit using the present principles set forth herein.

It is understood that various hardware, firmware, and software realizations are possible without departing from the scope of the present subject matter. Variations are also possible which do not depart from the present teachings. For instance, if a signal processor included analog to digital conversion electronics, it is understood that FIG. 1, blocks 120 and 102 could be realized by one signal processor. If a signal processor included a digital to analog conversion, then blocks 120 and 111 may be realized by a single processor. Likewise, in FIG. 12, it is possible that any combination of blocks could be realized by a single processor. For example, if a signal processor included analog to digital conversion, then it could include A/D converter 1202 with the remaining portion of the system. If a signal processor included digital to analog conversion, then the system could be realized in a single processor which would perform the system functions and that of D/A converter 1211. Thus, the examples set forth here are intended to demonstrate the principles of the present subject matter, but are not intended to be exclusive or exhaustive of the many variations and realizations possible.

It is further understood that the principles set forth herein can be applied to a variety of hearing assistance devices, including, but not limited to occluding and non-occluding applications. Some types of hearing assistance devices which may benefit from the principles set forth herein include, but are not limited to, behind-the-ear devices, over-the-ear devices, on-the-ear devices, and in-the ear devices, such as in-the-canal and/or completely-in-the-canal hearing assistance devices. Other applications beyond those listed herein are contemplated as well.

Conclusion

This application is intended to cover adaptations or variations of the present subject matter. It is to be understood that the above description is intended to be illustrative, and not restrictive. Thus, the scope of the present subject matter is determined by the appended claims and their legal equivalents.

What is claimed is:

1. A method for containing entrainment in audio processing, comprising:
converting an input sound into digital, frequency domain input subband signals each having subband frequencies;
producing error subband signals by subtracting estimated feedback subband signals from the input subband signals;
enabling or disabling output phase modulation for each signal of the input subband signals based on at least the subband frequencies of that signal;
applying the output phase modulation to adjust phase of the error subband signal corresponding to each signal of the input subband signals when the output phase modulation is enabled for that signal;
processing the error subband signals;
converting the processed error subband signals into an output sound; and
producing the estimated feedback subband signals using a bulk delay and an adaptive filter based on the processed error subband signals.

2. The method of claim 1, comprising disabling the output phase modulation for each signal of the input subband signals that has the subband frequencies below a predetermined frequency threshold.

3. The method of claim 2, comprising disabling the output phase modulation for each signal of the input subband signals that has the subband frequencies below 1250 Hz.

4. The method of claim 1, comprising enabling or disabling the output phase modulation for each signal of the input subband signals based on the subband frequencies of that signal and an energy in that signal.

5. The method of claim 4, comprising disabling the output phase modulation for all the input subband signals and freezing the adaptive filter when the energy in the signals of the input subband signals that have the subband frequencies within a specified transition band increases.

6. The method of claim 5, comprising enabling the output phase modulation for all the input subband signals and the adaptive filter when the energy in the signals of the input subband signals that have the subband frequencies within the specified transition band decreases.

7. The method of claim 6, wherein the transition band is about 750 Hz to 1250 Hz.

8. The method of claim 1, comprising enabling or disabling the output phase modulation for each signal of the input subband signals that is within a specified transition band based on the subband frequencies of that signal and an energy in the signals of the input subband signals that have the subband frequencies within a specified transition band relative to an energy in the other signals of the input subband signals.

9. The method of claim 8, comprising disabling the output phase modulation for all the input subband signals and freezing the adaptive filter when the energy in the signals of the input subband signals that have the subband frequencies within the specified transition band is greater than the energy in the other signals of the input subband signals by 12 dB.

10. The method of claim 9, wherein the transition band is about 750 Hz to 1250 Hz.

11. The method of claim 8, comprising disabling the output phase modulation for all the input subband signals and freezing the adaptive filter when the energy in all the input subband signals is less than a threshold energy.

12. An apparatus for entrainment containment in digital filters, comprising:
a summer configured to receive frequency domain input subband signals each having subband frequencies and estimated feedback subband signals and produce error subband signals by subtracting the estimated feedback subband signals from the input subband signals;
an output phase modulator configured to apply a gradual phase shift to the error subband signals and configured to be enabled or disabled for each signal of the input subband signals based on at least the subband frequencies of that signal;
a processing module configured to receive the error subband signals from the output phase modulator and process the received error subband signals; and
a feedback canceller filter configured to produce the estimated feedback subband signals using the processed error subband signals.

13. The apparatus of claim 12, wherein the output phase modulator is configured to be disabled for each signal of the input subband signals that has the subband frequencies below a predetermined frequency threshold.

14. The apparatus of claim 12, wherein the output phase modulator is configured to be enabled or disabled for each signal of the input subband signals based on the subband frequencies of that signal and an energy in that signal.

15. The apparatus of claim 14, wherein the output phase modulator is configured to be disabled for all the input subband signals when the energy in the signals of the input subband signals that have the subband frequencies within a specified transition band increases.

16. The apparatus of claim 15, wherein the output phase modulator is configured to be enabled disabled for all the input subband signals when the energy in the signals of the input subband signals that have the subband frequencies within the specified transition band decreases.

17. The apparatus of claim 12, wherein the output phase modulator is configured to be enabled or disabled for each signal of the input subband signals that has the subband frequencies within a specified transition band based on the subband frequencies of that signal and an energy in the signals of the input subband signals that have the subband frequencies within the specified transition band relative to an energy in the other signals of the input subband signals.

18. The apparatus of claim 17, wherein the output phase modulator is configured to be disabled for all the input subband signals when the energy in the signals of the input subband signals that have the subband frequencies within the specified transition band is greater than the energy in the other signals of the input subband signals by 12 dB.

19. The apparatus of claim 17, wherein the output phase modulator is configured to be disabled for all the input subband signals and freezing the adaptive filter when the energy in all the input subband signals is less than a threshold energy.

20. The apparatus of claim 12, comprising a hearing aid configured to receive an input sound, convert the input sound into the frequency domain input subband signals, and convert the processed phase shifted error subband signals into an output sound.

* * * * *